US012725915B2

(12) United States Patent
Sasaki et al.

(10) Patent No.: US 12,725,915 B2
(45) Date of Patent: Sep. 1, 2026

(54) ANTENNA DEVICE

(71) Applicant: YOKOWO CO., LTD., Tokyo (JP)

(72) Inventors: Ryo Sasaki, Tomioka (JP); Noriyoshi Nakada, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 72 days.

(21) Appl. No.: 18/684,708

(22) PCT Filed: Aug. 2, 2022

(86) PCT No.: PCT/JP2022/029634
§ 371 (c)(1),
(2) Date: Feb. 19, 2024

(87) PCT Pub. No.: WO2023/026790
PCT Pub. Date: Mar. 2, 2023

(65) Prior Publication Data
US 2025/0030155 A1 Jan. 23, 2025

(30) Foreign Application Priority Data
Aug. 27, 2021 (JP) ................................ 2021-138873

(51) Int. Cl.
*H01Q 1/40* (2006.01)
*H01Q 9/04* (2006.01)

(52) U.S. Cl.
CPC ........... *H01Q 1/405* (2013.01); *H01Q 9/0407* (2013.01)

(58) Field of Classification Search
CPC ........ H01Q 1/22; H01Q 1/405; H01Q 9/0407; H01Q 13/08
See application file for complete search history.

(56) References Cited

U.S. PATENT DOCUMENTS 5,438,697 A * 8/1995 Fowler .................. H01Q 23/00
333/204
2020/0243960 A1* 7/2020 Wittmann .............. H01Q 1/526

FOREIGN PATENT DOCUMENTS

JP H07-321528 A 12/1995
JP H10-276020 A 10/1998
JP H11-074716 A 3/1999
JP 2012-194137 A 10/2012
JP 2017-063255 A 3/2017

OTHER PUBLICATIONS

International Search Report and Written Opinion mailed on Sep. 27, 2022, received for PCT Application PCT/JP2022/029634, filed on Aug. 2, 2022, 09 pages including English Translation.
Office Action issued Jul. 15, 2025 in counterpart Japanese Patent Application No. 2021-138873.

* cited by examiner

*Primary Examiner* — Hoang V Nguyen
(74) *Attorney, Agent, or Firm* — XSENSUS LLP

(57) ABSTRACT

An antenna device comprising: an exterior body forming an accommodation space; a substrate accommodated in the accommodation space and held by the exterior body; a patch antenna accommodated in the accommodation space and disposed on the substrate; and an elastic body disposed between the exterior body and the patch antenna.

20 Claims, 10 Drawing Sheets

ANTENNA DEVICE

CROSS-REFERENCE TO RELATED APPLICATIONS

The present application is based on PCT filing PCT/JP2022/029634, filed Aug. 2, 2022, which claims priority from Japanese Patent Application No. 2021-138873, filed Aug. 27, 2021, the contents of each are hereby incorporated by reference.

TECHNICAL FIELD

The present disclosure relates to an antenna device.

BACKGROUND ART

PTL 1 discloses an antenna device including a patch antenna accommodated in an exterior body that is constituted by a top cover and a bottom cover.

CITATION LIST

Patent Literature

[PTL 1] Japanese Patent Application Publication No. 2017-063255

SUMMARY OF INVENTION

Technical Problem

When antenna device receives shock or vibrations, for example, the patch antenna may contacts the inner wall surface of the exterior body, which may result in damage to the patch antenna.

An example of an object of the present disclosure is to suppress damage to a patch antenna when an antenna device receives shock or vibrations. Other objects of the present disclosure will become apparent from the present specification given herein.

Solution to Problem

An aspect of the present disclosure is an antenna device comprising: an exterior body forming an accommodation space; a substrate accommodated in the accommodation space and held by the exterior body; a patch antenna accommodated in the accommodation space and disposed on the substrate; and an elastic body disposed between the exterior body and the patch antenna.

According to an aspect described above of the present disclosure, it is possible to suppress damage to a patch antenna, when an antenna device receives shock or vibrations.

DESCRIPTION OF EMBODIMENTS

Figure 1:
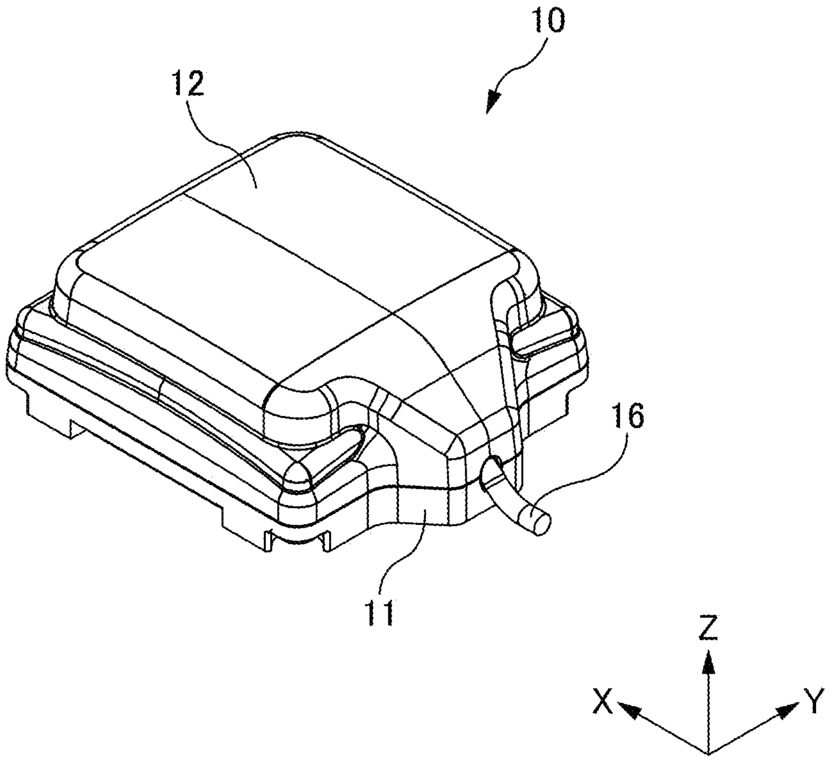
FIG. 1 is a perspective view illustrating an antenna device 10.

At least following matters will become apparent from the present description and the accompanying drawings.

Hereinafter, preferred embodiments of the present disclosure will be described with reference to the drawings. The same or equivalent components, members, and the like illustrated in the drawings are given the same reference numerals, and an overlapping description is omitted as appropriate.

==Overview of Antenna Device 10 of Embodiment of Present Disclosure==

First, an overview of a configuration of an antenna device 10 will be described with reference to FIGS. 1 and 2.

FIG. 1 is a perspective view of the antenna device 10. FIG. 2 is an exploded perspective view of the antenna device 10.

Figure 2:
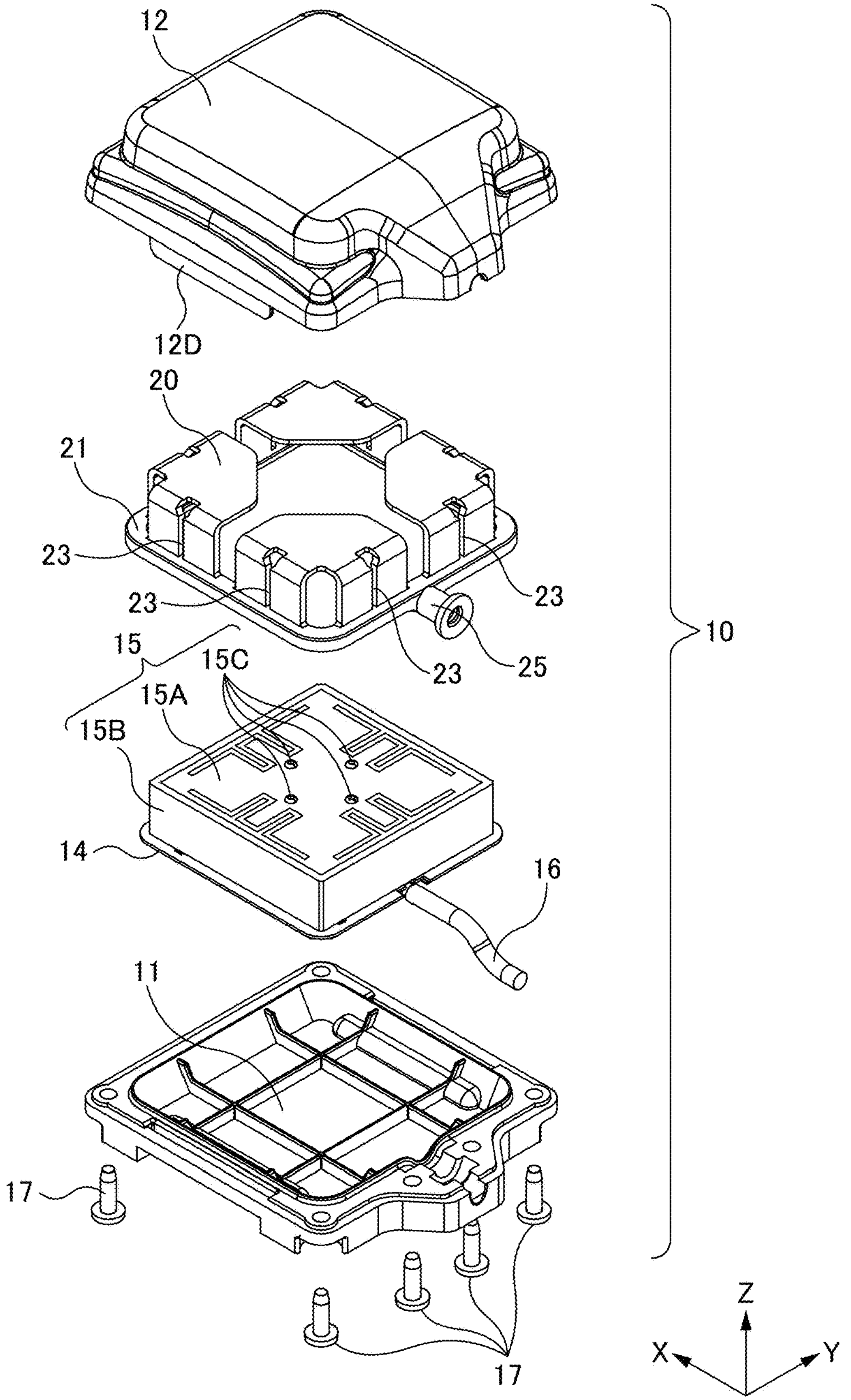
FIG. 2 is an exploded perspective view illustrating an antenna device 10.

As illustrated in FIGS. 1 and 2, directions parallel to the surface where the antenna device 10 is provided are defined as an X direction and a Y direction. The direction in which a coaxial cable 16 connected to the antenna device 10 extends is defined as the X direction, and the direction perpendicular to the X direction is defined as the Y direction. Further, the direction perpendicular to the surface where the antenna device 10 is provided is defined as a Z direction. The X direction may be referred to as "front-rear direction"; the Y direction may be referred to as "left-right direction"; and the Z direction may be referred to as "up-down direction". Further, as illustrated in FIGS. 1 and 2, the directions in which the arrows point are defined as +X direction (forward direction), +Y direction (rightward direction), and +Z direction (upward direction), respectively.

The antenna device 10 is a device including a patch antenna 15 and a substrate 14 at which the patch antenna 15 is disposed.

Further, in an embodiment of the present disclosure, the antenna device 10 is a vehicular antenna device to be used at a vehicle not illustrated. In an embodiment of the present disclosure, the term "vehicular" means "being mountable to a vehicle", and thus it is not limited to an aspect of being attached to a vehicle, but also includes an aspect of being brought into a vehicle and used in a vehicle. The antenna device 10, which is a vehicular antenna device, is provided at a roof or in an instrument panel of a vehicle. However, the antenna device 10 may be provided at a part of the vehicle other than the roof, the inside of the instrument panel, and the like. Further, the antenna device 10 may be an antenna device other than that of an aspect of being used for a wheeled "vehicle". The antenna device 10 may be an antenna device (an antenna device for a mobile vehicle) used for, for example, an air vehicle such as a drone or the like, and a mobile vehicle such as a probe, a robot, wheel-less construction machinery, agricultural machinery, a vessel, or the like.

Figure 5A:
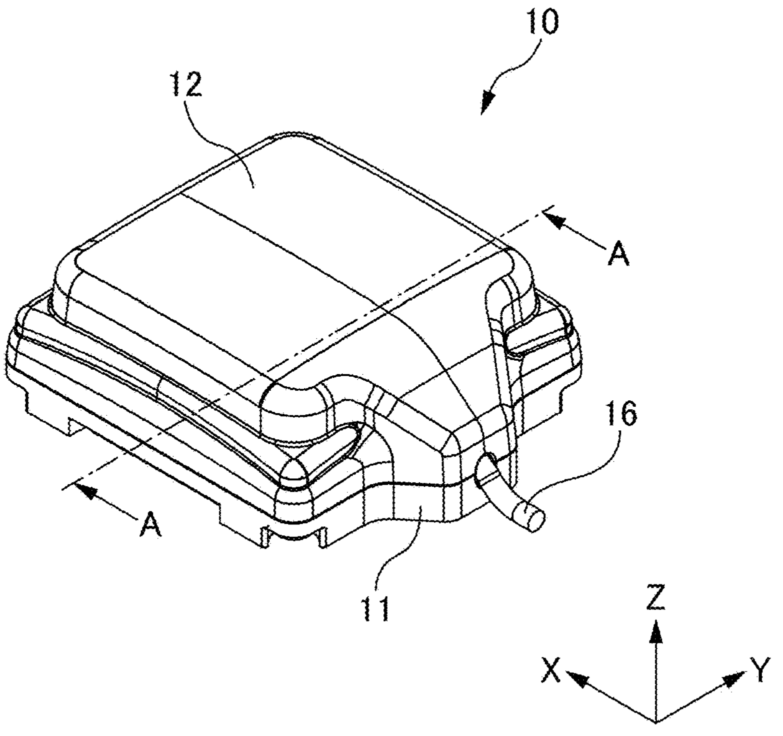
FIG. 5A is a perspective view of an antenna device 10 illustrating a cutting line.
Figure 5B:
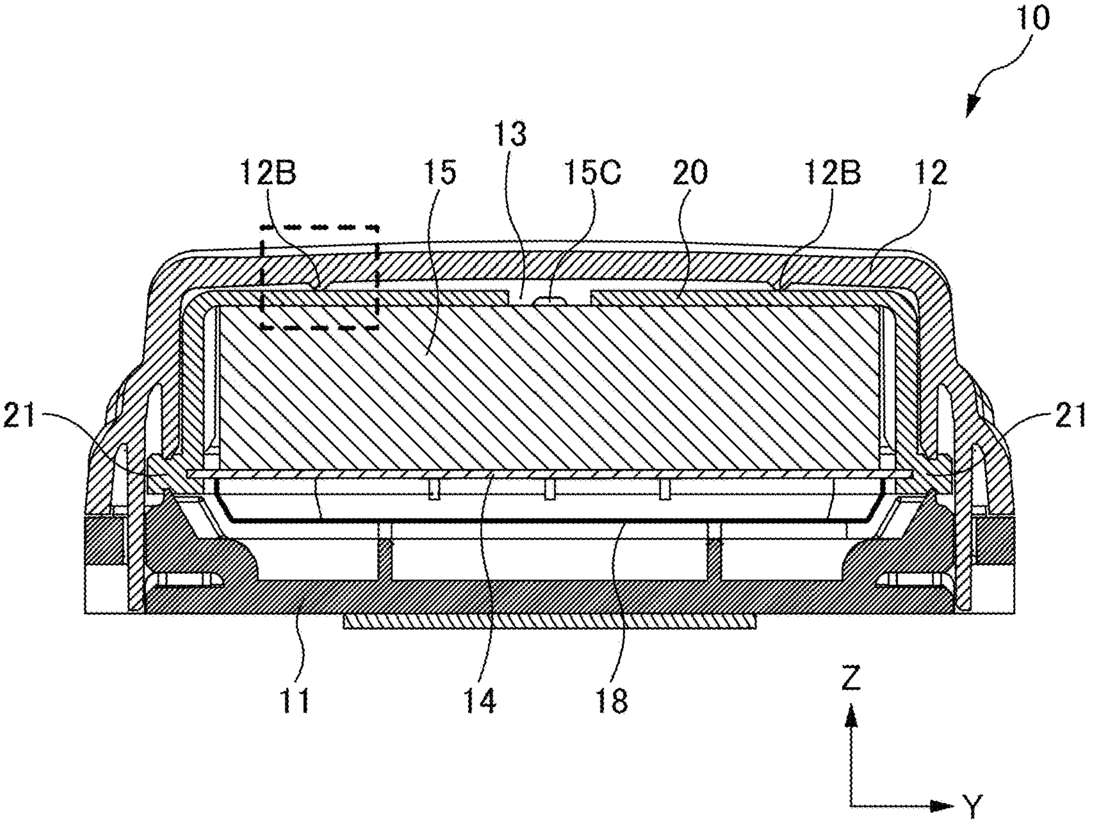
FIG. 5B is a cross-sectional view illustrating an antenna device 10 taken along a line A-A.

The antenna device 10 includes a base 11, a case 12, the substrate 14, a shield cover 18, the patch antenna 15, and an elastic body 20, as illustrated in FIG. 2 and FIG. 5B described later.

The base 11 is a member forming the bottom surface of the antenna device 10. In an embodiment of the present disclosure, the base 11 is made of insulating resin. However, the base 11 may be made of a material other than insulating resin, such as metal or the like. Further, the base 11 may include an insulating resin part and a metal part. The base 11 is fixed to the case 12 with a plurality of screws 17, as illustrated in FIG. 2. However, the base 11 is not limited to the case in which the base 11 is fixed to the case 12 with screws, but may be fixed thereto by snap fit, welding, adhesion, and/or the like.

The base 11 may function as a ground of an antenna by being made of metal and/or the like or including a metal plate and/or the like.

Further, the base 11 can freely combine members to form the bottom surface of the antenna device 10.

The case 12 is a member forming the upper surface of the antenna device 10. In an embodiment of the present disclosure, the case 12 is made of insulating resin. However, the case 12 may be made of a material allowing radio waves to pass therethrough, other than insulating resin. Further, the case 12 may include a part made of insulating resin and a part made of other material allowing radio waves to pass therethrough, and may include any combination of members. The case 12 is fixed to the base 11 with the plurality of screws 17, as illustrated in FIG. 2. However, the case 12 is not limited to the case in which the case 12 is fixed to the base 11 with screws, but may be fixed thereto by snap fit, welding, adhesion, and/or the like.

In an embodiment of the present disclosure, the base 11 and the case 12 accommodate at least the substrate 14 and the patch antenna 15. In other words, the base 11 and the case 12 form an accommodation space 13 to accommodate the substrate 14 and the patch antenna 15. Further in other words, the base 11 and the case 12 are members to cover the substrate 14 and the patch antenna 15. Accordingly, hereinafter, the base 11 and the case 12 may be collectively referred to as "exterior body". Further, either one of the base 11 or the case 12 may be referred to as "exterior body".

As described above, the base 11 on the bottom surface side of the antenna device 10 and the case 12 on the top surface side of the antenna device 10 constitute the exterior body. However, an aspect of the configuration of the exterior body is not limited thereto. For example, the exterior body may be constituted by two members that are a member on the left surface side of the antenna device 10 and a member on the right surface side of the antenna device 10. Further, when the antenna device 10 is a typical shark-fin antenna, the base 11 and the case 12 may be a housing of the shark fin antenna. That is, the designations "base" and "case" in an embodiment of the present disclosure are convenient designations given based on an aspect of the structure of the exterior body.

The substrate 14 is a circuit substrate where the patch antenna 15 is disposed. In an embodiment of the present disclosure, the substrate 14 is made of a material such as glass epoxy resin or the like, for example. However, the substrate 14 may also be made of a material other than glass epoxy resin, such as phenol resin or the like. Further, in an embodiment of the present disclosure, it is formed into a plate shape. However, the entire substrate 14 does not have to be formed in a plate shape, but the substrate 14 may have a part formed in a shape other than a plate shape.

Hereinafter, the surface of the substrate 14 on the +Z direction side is defined as a "front surface", and the surface of the substrate 14 on the −Z direction side is defined as a "back surface". Further, the +Z direction side may be referred to as "front surface side" and the −Z direction side may be referred to as "back surface side".

A conductive pattern not illustrated is formed in the front surface and the back surface of the substrate 14. A ground conductor plate (ground conductor film) of the patch antenna 15 and a conductive pattern that functions as a ground of a circuit not illustrated are formed at the front surface of the substrate 14. A conductive pattern to which a signal line of the coaxial cable 16 from an amplifier substrate (not illustrated) is connected is formed at the back surface of the substrate 14. However, the conductive pattern formed at the substrate 14 is not limited thereto.

The shield cover 18 is a member that electrically shields the amplifier substrate disposed at the back surface of the substrate 14, and made of metal. The shield cover 18 is attached to the back surface of the substrate 14 as illustrated in FIG. 5B described later, although not illustrated in FIG. 2.

In an embodiment of the present disclosure, the patch antenna 15 is a planar antenna supporting radio waves for global navigation satellite system (GNSS), for example, and supports radio waves in the 1.5 GHz band for GNSS. The communication standard and the frequency band supported by the patch antenna 15 are not limited to the above, but may be other communication standards and frequency bands.

The patch antenna 15 may support radio waves of a plurality of frequency bands such as L1 band, L2 band, L5 band, and the like in order to achieve a wider frequency band and increase gain, and performs at least one of transmission or reception of radio waves of a desired frequency band.

The patch antenna 15 may be an antenna other than that supporting the radio waves for GNS, such as an antenna supporting radio waves for Sirius XM (SXM), or an antenna supporting radio waves for Vehicle-to-Everything (V2X).

The patch antenna 15 includes a radiating element 15A and a dielectric 15B, as illustrated in FIG. 2.

The radiating element 15A is an element capable of performing at least one of reception or transmission of signals (radio waves) of a desired frequency band, and is, in an embodiment of the present disclosure, a substantially quadrilateral conductive member having an area smaller than the area of the front surface of the dielectric 15B, as illustrated in FIG. 2. Here, the term "substantially quadrilateral" means a shape consisting of four sides including a square or a rectangle, for example, and at least part of corners thereof may be cut away obliquely relative to a side thereof, for example. Further, in the "substantially quadrilateral" shape, a recess (recessed portion) or a protrusion (protruding portion) may be provided at part of sides thereof. The shape of the radiating element 15A is not limited to the substantially-quadrilateral shape, but may be a circular shape, an elliptical shape, or the like, for example. That is, the radiating element 15A may have any shape as long as it can perform at least one of reception or transmission of signals (radio waves) of the desired frequency band.

As illustrated in FIG. 2, the radiating element 15A is provided at the front surface of the dielectric 15B. Further, the direction normal to the radiation surface of the radiating element 15A is the +Z direction.

The radiating element 15A includes feeding points 15C as illustrated in FIG. 2. The feeding points 15C are points at which a feeder of the coaxial cable 16 illustrated in FIG. 2 is electrically connected to the radiating element 15A. An embodiment of the present disclosure employs a configuration in which four feeding points 15C are provided, that is, a quadruple-feed system. However, the radiating element 15A may employ a double-feed system or a single-feed system so as to be able to perform at least one of transmission or reception of radio waves having desired polarization, for example. Further, the radio waves are not limited to the circularly polarized waves, but may also be linearly polarized waves.

The dielectric 15B is a substantially-quadrilateral plate-shaped member made of a dielectric material such as ceramic or the like. However, the dielectric 15B is not limited to a substantially quadrilateral shape, but may also be a circular or elliptical shape, for example.

The front surface and the back surface of the dielectric 15B are, as illustrated in in FIG. 2, parallel to the X direction and the Y direction, and the front surface of the dielectric 15B is oriented in the +Z direction, while the back surface of the dielectric 15B is oriented in the −Z direction. A conductive pattern functioning as a ground conductor plate (ground conductor film) is formed at the back surface of the dielectric 15B. The back surface of the dielectric 15B is attached to the substrate 14 with adhesive, double-sided tape, solder, or the like (not illustrated), for example. Accordingly, the patch antenna 15 results in being disposed at the substrate 14.

The elastic body 20 is a cushioning material disposed between members constituting the antenna device 10. Further, the elastic body 20 is also a member to ensure the waterproofness of the accommodation space 13 in the antenna device 10. In an embodiment of the present disclosure, the elastic body 20 is disposed between the patch antenna 15 and the exterior body (the base 11 or the case 12). Further, in an embodiment of the present disclosure, the elastic body 20 is disposed between the substrate 14 and the exterior body (the base 11 or the case 12).

==Details of Patch Antenna 15==

The patch antenna 15 of the antenna device 10 of an embodiment of the present disclosure supports radio waves of at least two frequency bands among a plurality of frequency bands such as L1 band, L2 band, L5 band, and the like, in order to achieve a wider frequency band and increase gain. The patch antenna 15 may increase in size when supporting a plurality of frequency bands and/or supporting relatively low radio waves. Then, with an increase in size of the patch device 15, the gravity applied to the patch antenna 15 also increases, and when the antenna device 10 receive shock or vibrations, the patch antenna 15 may contact the inner wall surface of the exterior body (e.g., the case 12, herein), which may result in damage to the patch antenna 15.

Even if the patch antenna 15 supports radio waves of a single frequency band, the gravity applied to the patch antenna 15 may increase with an increase in the size of the patch antenna 15 in order to support relatively low radio waves or a change in the material of the constituent member (e.g., the dielectric 15B) of the patch antenna 15. In such a case, when the antenna device 10 receives shock or vibrations, the patch antenna 15 may contact the inner wall surface of the exterior body, which may result in damage to the patch antenna 15.

Further, although an increase in the gravity applied to the patch antenna 15 has been described here as an example, the present disclosure is not limited thereto. For example, with an increase in the amount of deformation (e.g., the amount of change in deflection) of the substrate 14 according to a reduction in the thickness of the substrate 14; an increase in shock or vibrations received by the antenna device 10; and/or the like as well, the patch antenna 15 may contact the inner wall surface of the exterior body, which may result in damage to the patch antenna 15, similarly, when the antenna device 10 receives shock or vibrations. The antenna device 10 of an embodiment of the present disclosure is mounted to a mobile body such as a vehicle, construction machinery, agricultural machinery, a robot, and a drone as described above, and thus the effects of shock or vibrations on the antenna device 10 should be particularly considered.

Figure 3A:
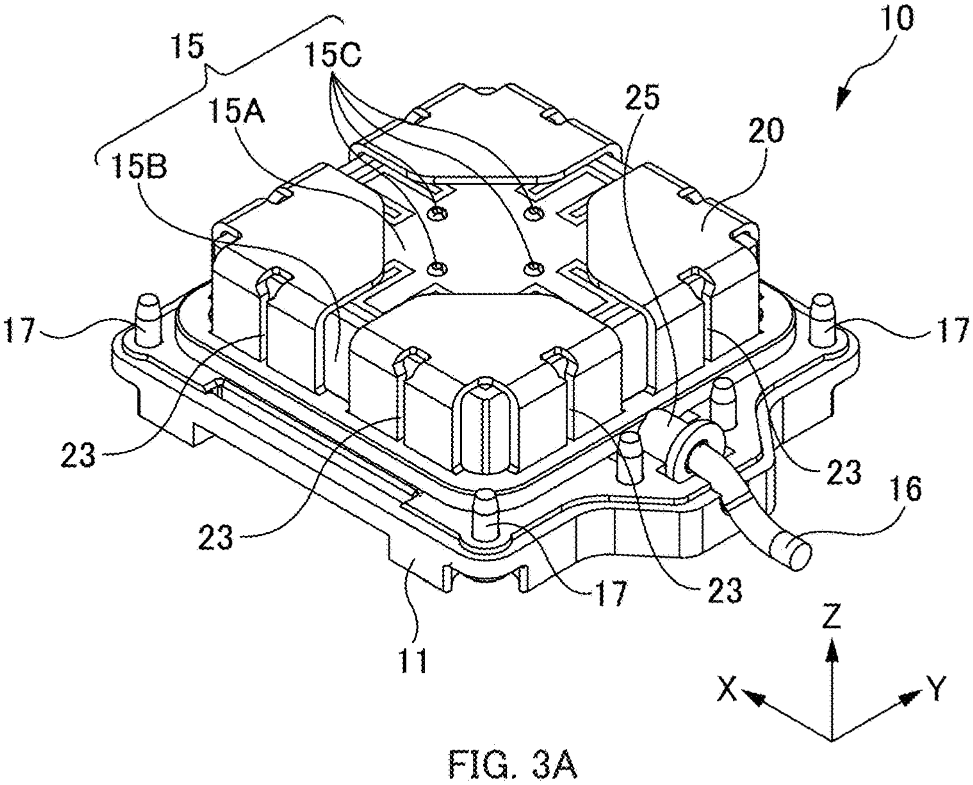
FIG. 3A is a perspective view illustrating an antenna device 10 with a case 12 removed.
Figure 3B:
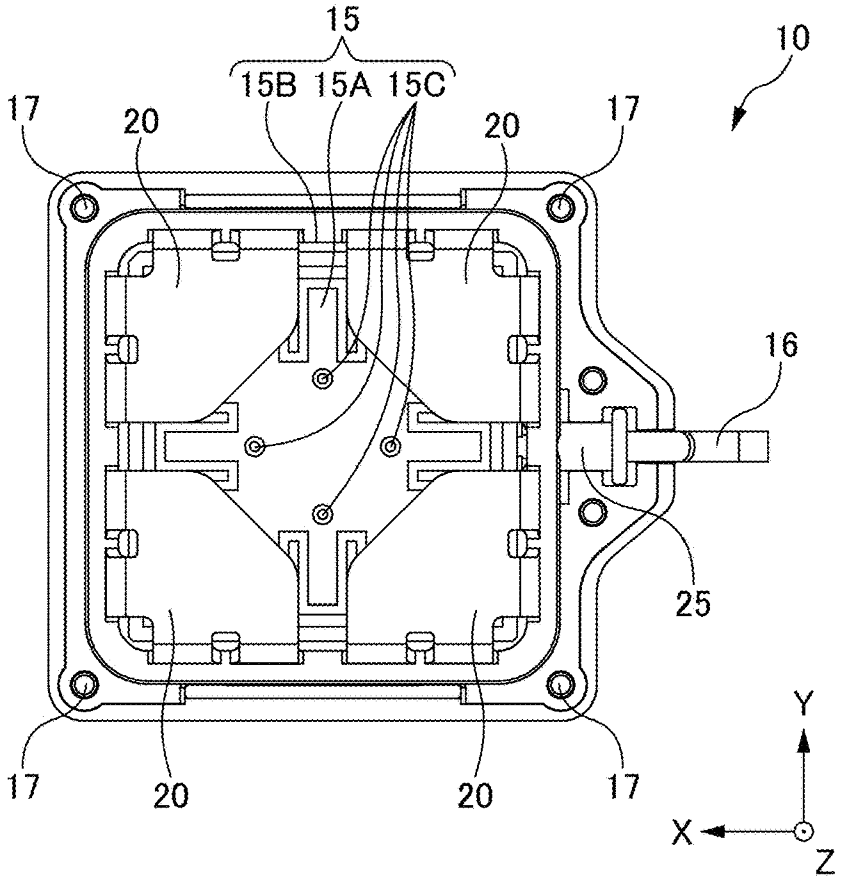
FIG. 3B is a top view illustrating an antenna device 10 with a case 12 removed.

Thus, in an embodiment of the present disclosure, with the elastic body 20 being disposed between the exterior body and the patch antenna 15, as illustrated in FIGS. 2 to 3B, to serve as a cushioning material when the antenna device 10 receives shock or vibrations, it is possible to suppress damage to the patch antenna 15.

==Details of Elastic Body 20==

The following describes the details of the elastic body 20, which is a feature of the antenna device 10 of an embodiment of the present disclosure.

FIGS. 3A and 3B are diagrams illustrating the antenna device 10 with the case 12 removed. FIG. 3A illustrates a perspective view of the antenna device 10 with the case 12 removed, and FIG. 3B illustrates a top view of the antenna device 10 with the case 12 removed.

In an embodiment of the present disclosure, the elastic body 20 is provided so as to cover the sides and top of the patch antenna 15, as illustrated in FIGS. 3A and 3B. This makes it possible to suppress damage to the patch antenna 15 caused by the patch antenna 15 contacting the inner wall surface of the case 12 when the antenna device 10 receives shock or vibrations.

However, the elastic body 20 may be provided so as to cover only one either the sides or the top of the patch antenna 15. For example, when it is desired to suppress particularly damage to the patch antenna 15 caused by vibrations in the direction horizontal to the XY plane of the antenna device 10, the elastic body 20 may be provided so as to cover only the sides of the patch antenna 15. This can also suppress damage to the patch antenna 15 caused by the patch antenna 15 contacting the inner wall surface of the case 12 when the antenna device 10 receives shock or vibrations.

In an embodiment of the present disclosure, the elastic body 20 is provided to cover particularly the top of the patch antenna 15, as illustrated in FIGS. 3A and 3B. That is, in an embodiment of the present disclosure, at least part of the elastic body 20 is disposed between the exterior body (e.g., the case 12 herein) and the front surface of the patch antenna 15. In other words, the elastic body 20 has overlapping portions to overlap with the front surface of the patch antenna 15 in the top view illustrated in FIG. 3B. This makes it possible to suppress damage to the radiating element 15A, which is particularly affected by damage in the patch antenna 15, caused by the radiating element 15A contacting the inner wall surface of the case 12.

The elastic body 20 of an embodiment of the present disclosure is provided so as not to overlap with the power feeding points 15C of the patch antenna 15 in the top view illustrated in FIG. 3B. This makes it possible to suppress the influence of the elastic body 20 on the radiation of the patch antenna 15. However, when the influence on the radiation of the patch antenna 15 can be tolerated, the elastic body 20 may be provided so as to overlap the feeding points 15C. In this case, the elastic body 20 may overlap with all the feeding points 15C among the four feeding points 15C, or may overlap with part of the feeding points 15C.

As described above, in an embodiment of the present disclosure, the elastic body 20 has overlapping portions to overlap with the front surface of the patch antenna 15. Here, the elastic body 20 is provided so as to include at least two overlapping portions. Specifically, the elastic body 20 is provided so as to include four overlapping portions, as illustrated in FIG. 3B. The four overlapping portions of the elastic body 20 are positioned symmetrically with respect to the center of the patch antenna 15 in the top view illustrate in FIG. 3B.

Here, the "center" of the patch antenna 15 in the top view refers to the center point, that is, the geometric center, in the shape of the outer edge of the patch antenna 15 in the top view. Further, "symmetry" with respect to the center of the patch antenna 15 refers to rotational symmetry including point symmetry in which the positions of the overlapping portions match when rotated by a predetermined angle around the center of the patch antenna 15.

With the four overlapping portions of the elastic body 20 being positioned symmetrically with respect to the center of the patch antenna 15 in the top view illustrated in FIG. 3B, the elastic body 20 can evenly receive shock and vibrations to the patch antenna 15. However, the four overlapping portions of the elastic body 20 do not have to be positioned symmetrically with respect to the center of the patch antenna 15 in the top view illustrated in FIG. 3B. Moreover, the elastic body 20 may be provided so as to have at least one overlapping portion instead of four overlapping portions.

In an embodiment of the present disclosure, the patch antenna 15 is formed into a substantially quadrilateral shape in the top view illustrated in FIG. 3B, and the four overlapping portions of the elastic body 20 are provided so as to cover the four corners of the patch antenna 15. However, the overlapping portions of the elastic body 20 may be arranged only along the sides of the substantially quadrilateral shape of the patch antenna 15, without covering the corners of the patch antenna 15. Further, the overlapping portion covering the corner of the patch antenna 15 and the overlapping portion arranged only along the side of the substantially quadrilateral shape of the patch antenna 15 may coexist.

==Pressing Member 12B==

Further, in an embodiment of the present disclosure, the shaking of the patch antenna 15 is suppressed with not only the patch antenna 15 being covered with the elastic body 20, but also the pressing members 12B, which will be described later. With suppression of the shaking of the patch antenna 15, it is possible to further suppress damage to the patch antenna 15 caused by the patch antenna 15 contacting the inner wall surface of the case 12 when the antenna device 10 receives shock or vibrations. As described above, in an embodiment of the present disclosure, the gravity applied to the patch antenna 15 increases with an increase in the size of the patch antenna 15, and thus it is particularly advantageous to suppresses the shaking of the patch antenna 15 by virtue of the pressing members 12B when the antenna device 10 receives shock or vibrations. The following describes the pressing members 12B.

Figure 4:
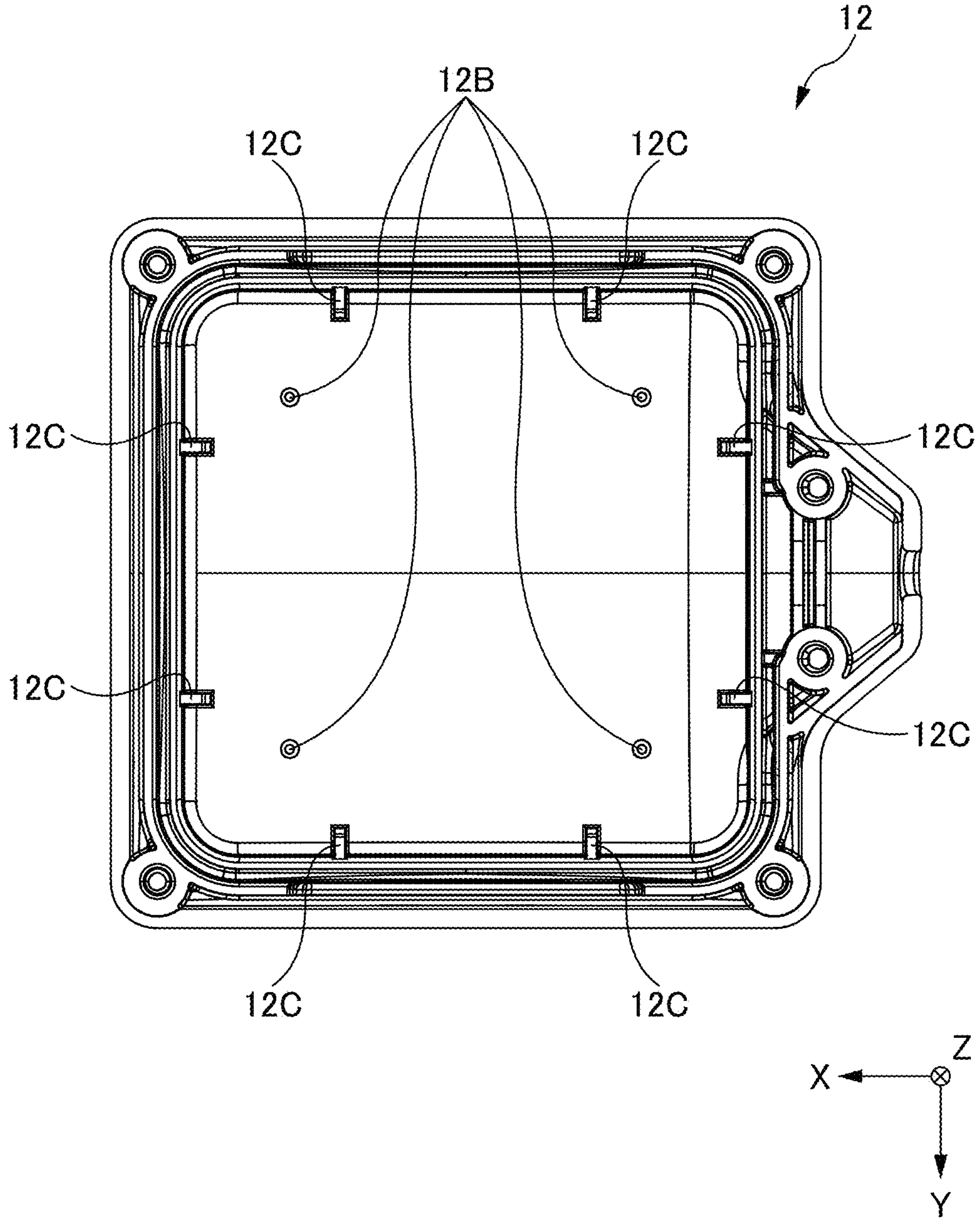
FIG. 4 is a bottom view of a case 12.
Figure 6:
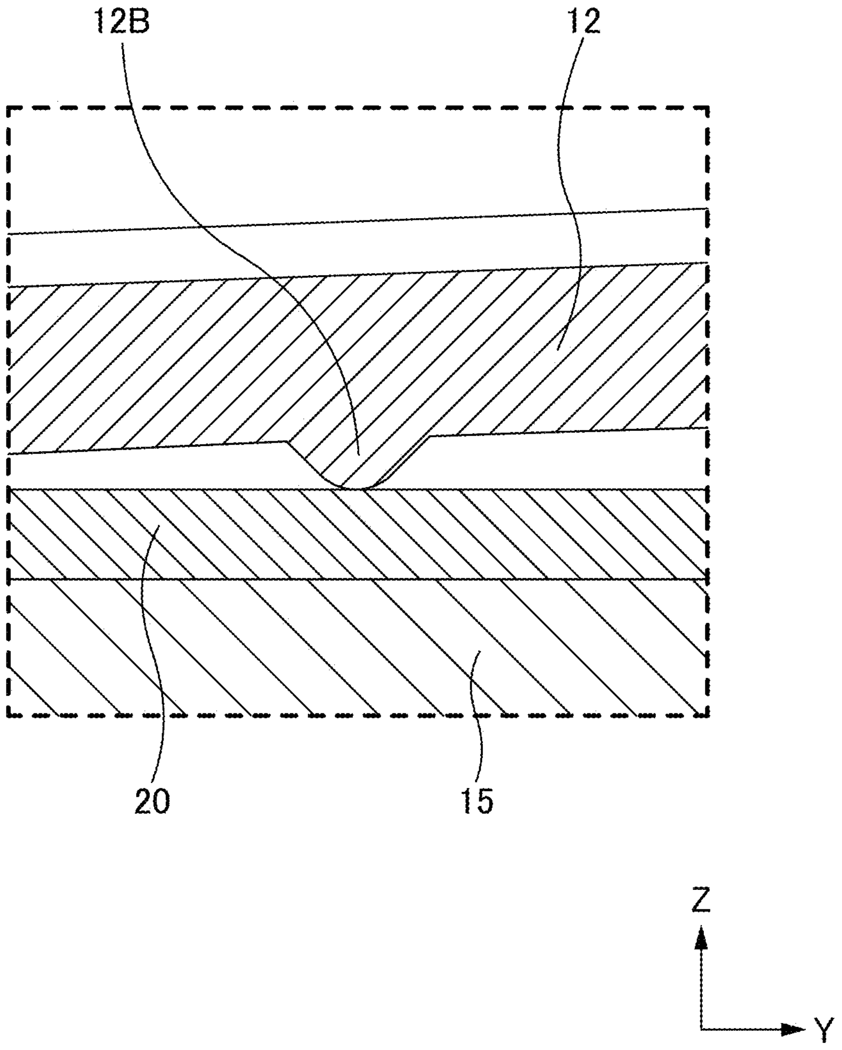
FIG. 6 is an enlarged view illustrating a pressing member 12B.

FIG. 4 is a bottom view of the case 12. FIGS. 5A and 5B are diagrams to illustrate the pressing members 12B of the antenna device 10. FIG. 5A is a perspective view of the antenna device 10 illustrating a cutting line, and FIG. 5B is a cross-sectional view of the antenna device 10 taken along a line A-A. FIG. 6 is an enlarged view of the pressing member 12B.

In an embodiment of the present disclosure, the case 12 includes the pressing members 12B, as illustrated in FIGS. 4 to 6. The pressing members 12B are members to press the elastic body 20 against the patch antenna 15.

The pressing members 12B are formed at the upper inner wall surface of the case 12, as illustrated in FIG. 5B. Further, as illustrated in FIG. 6, the pressing members 12B are formed so as to protrude downward. That is, the pressing members 12B are the protruding portions formed at the upper inner wall surface of the case 12. In an embodiment of the present disclosure, the tips of the protruding portions of the pressing members 12B contact the elastic body 20. However, part of the protruding portions may contact the elastic body 20, or all of the protruding portions may contact the elastic body 20.

Further, the pressing members 12B are not limited to the arrangement, shape, and the like illustrated in FIGS. 5B and 6, as long as they are members to press the elastic body 20 against the patch antenna 15.

The pressing members 12B of an embodiment of the present disclosure illustrated in FIG. 5B are formed at the upper inner wall surface of the case 12. However, the pressing member 12B may be formed at the side inner wall surface of the case 12, for example, and formed so as to protrude toward the patch antenna 15, to thereby press the elastic body 20 toward the side surfaces of the patch antenna 15 against the patch antenna 15.

Further, the end parts of the pressing members 12B of an embodiment of the present disclosure illustrated in FIG. 5B are each formed into a hemispherical shape. However, the end parts of the pressing members 12B each may have a shape having a curved surface at the tip (e.g., semi-elliptic spherical shaped), a shape having a pointed tip (e.g., triangular shape), or a shape having a flat surface at its tip (e.g., quadrilateral shape).

Further, as illustrated in FIG. 4, the pressing members 12B of an embodiment of the present disclosure are formed in a dot shape when viewed from below. However, the pressing members 12B may be formed in a rib shape having a predetermined length or may be formed in a lattice shape when viewed from below.

Further, in an embodiment of the present disclosure, the pressing members 12B are provided as part of the case 12, but the present disclosure is not limited thereto. For example, the pressing members 12B may be provided as members that are separate from both the case 12 and the elastic body 20, and may be disposed between the case 12 and the elastic body 20.

The pressing members 12B may be provided as part of the elastic body 20. For example, the pressing members 12B may be formed in at least one of the upper surface or the side surfaces of the elastic body 20 so as to protrude toward the case 12, to thereby be pressed against the case 12. In this case, in order to suppress the shaking of the patch antenna 15, the pressing members 12B, which constitute part of the elastic body 20, needs to be disposed in a sufficiently deformed state. Thus, if the elastic body 20 is made of a material that is more easily deformable than the material of the case 12, the pressing members 12B, which are part of the elastic body 20, need to be formed to have a predetermined size or more. Accordingly, rather than providing the pressing members 12B as part of the elastic body 20, it is more desirable to provide the pressing members 12B as part of the case 12, as in an embodiment of the present disclosure, because restriction on the minimum size of the pressing member 12B is less strict.

From the above, the elastic body 20 pressed by the pressing members 12B contacts the case 12 and the patch antenna 15, as illustrated in FIG. 6. Further, the elastic body 20 pressed by the pressing member 12B is disposed between the case 12 and the patch antenna in a deformed state. This makes it possible to suppress the shaking of the patch antenna 15.

In an embodiment of the present disclosure, the case 12 has a plurality of pressing members 12B, as illustrated in FIG. 4. Specifically, it is provided to have four pressing members 12B. As such, with the elastic body 20 being pressed against the patch antenna 15 using the plurality of pressing members 12B, it is possible to further suppress the shaking of the patch antenna 15. However, the case 12 may have a single pressing member 12B.

Further, in an embodiment of the present disclosure, the four pressing members 12B are positioned symmetrically with respect to the center of the case 12 in the bottom view illustrated in FIG. 4. As such, the plurality of pressing members 12B, which are positioned symmetrically with respect to the center of the case 12, press the elastic body 20 against the patch antenna 15, thereby being able to suppress the shaking of the patch antenna 15 evenly. The four pressing members 12B do not have to be positioned symmetrically with respect to the center of the case 12.

In the antenna device 10 of an embodiment of the present disclosure, as illustrated in FIG. 5B, the elastic body 20 sandwiched between the base 11 and the case 12 holds the substrate 14. Specifically, the elastic body 20 is sandwiched between the end parts of the protruding portions (ribs) of the base 11 and the end parts of the protruding portions (ribs) of the case 12. Accordingly, with the elastic body 20 being sandwiched with the protruding portions (ribs) of the base 11 and the protruding portions (ribs) of the case 12, it is possible to sufficiently sandwich the elastic body 20, and in particular, improve the waterproofness of the accommodation space 13.

Then, with the end part of the substrate 14 being inserted into the cut of the elastic body 20 formed along the end part of the substrate 14, holding portions 21 located above and below the cut sandwich the end part of the substrate 14, so that the substrate 14 is held. In this way, in the antenna device 10 of an embodiment of the present disclosure, the substrate 14 is held by the exterior body (here, the base 11 and the case 12) through the elastic body 20. However, the substrate 14 may be directly fixed to the base 11 or the case 12 with screws and/or the like without using the elastic body 20.

Further, the elastic body 20 has a grommet 25, as illustrated in FIG. 2 described above. The grommet 25 is a part of the elastic body 20 through which the coaxial cable 16 is inserted. In an embodiment of the present disclosure, with the grommet 25 being sandwiched with the base 11 and the case 12, it is possible to improve the waterproofness around the coaxial cable 16.

The inner diameter of the grommet 25 through which the coaxial cable 16 is inserted is formed slightly larger than the diameter (outer diameter) of the coaxial cable 16. In the interior of the grommet 25, at least one rib not illustrated that protrudes toward the coaxial cable 16 is provided thereto around the outer periphery of the coaxial cable 16. With the grommet 25 having such an internal shape, it is possible to facilitate the insertion of the coaxial cable 16 into the grommet 25, and ensure waterproofness around the coaxial cable 16. However, the rib may not be provided in the interior of the grommet 25, and the inner diameter of the grommet 25 may be substantially the same as the diameter of the coaxial cable 16.

==Mounting Member 30==

As described above, the antenna device 10 is mounted to a vehicle or the like. Thus, the antenna device 10 of an embodiment of the present disclosure includes a mounting member 30 in order to facilitate mounting to and removal from a steel material constituting a vehicle or the like. The following describes the details of the mounting members 30.

Figure 7:
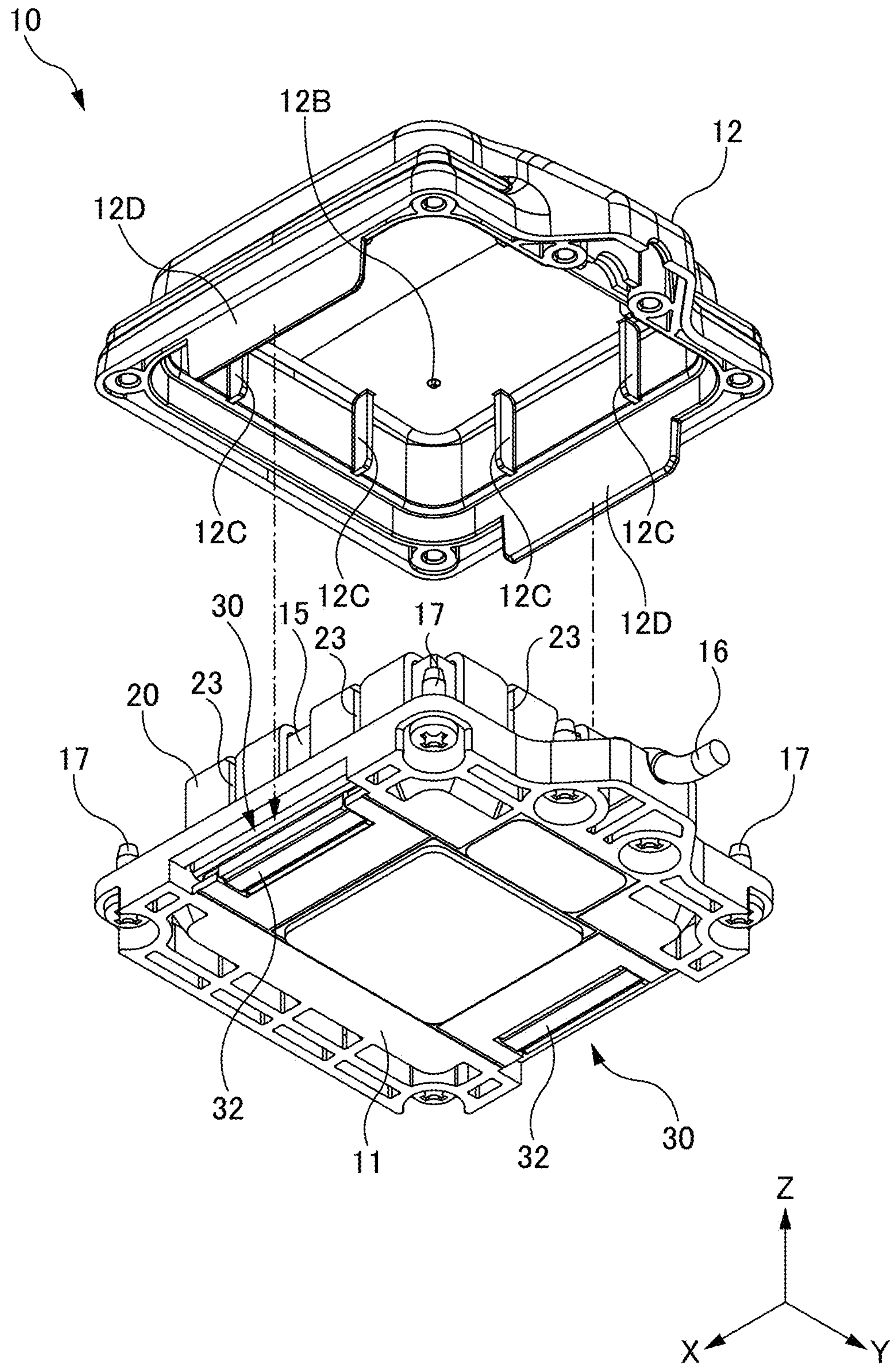
FIG. 7 is an exploded perspective view illustrating an antenna device 10 in which only a case 12 has been moved.
Figure 8:
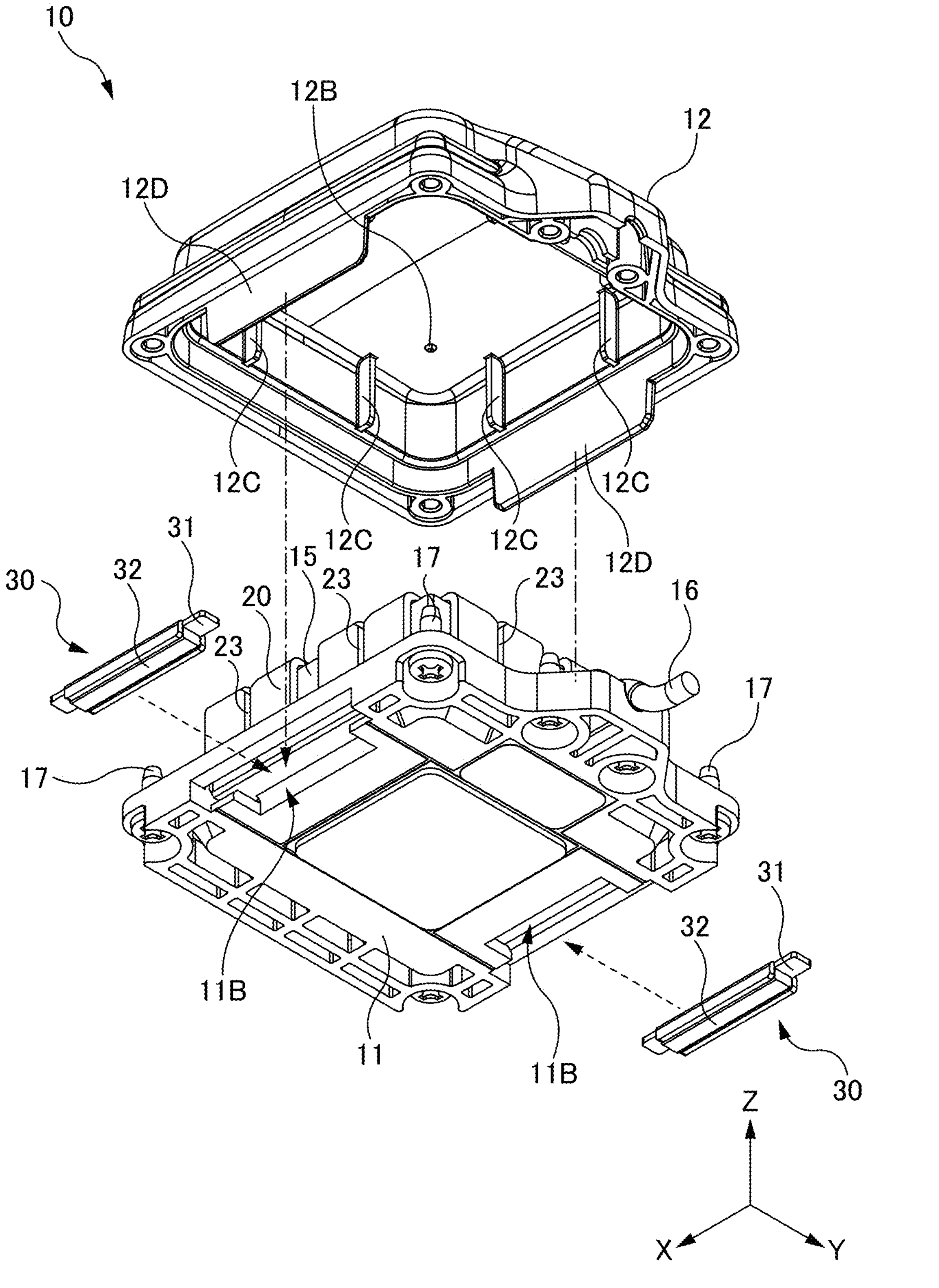
FIG. 8 is an exploded perspective view illustrating an antenna device 10 in which a case 12 and a mounting member 30 have been moved.

FIG. 7 is an exploded perspective view illustrating the antenna device 10 in which only the case 12 has been moved. FIG. 8 is an exploded perspective view illustrating the antenna device 10 in which the case 12 and the mounting members 30 have been moved.

The mounting members 30 are members enabling mounting to and removal from a steel material of the antenna device 10. The mounting members 30 are mounted to the base 11 both on the left and right sides, as illustrated in FIG. 7. The mounting members 30 are mounted to the base 11 such that magnets 32 (described later) of the mounting members 30 are exposed on the bottom surface side of the base 11.

The mounting members 30 each have a yoke 31 and the magnet 32.

The yoke 31 is a member to hold the magnet longitudinal 32. As illustrated in FIG. 8, the magnet 32 is fixed to the yoke 31 at the center part thereof in the direction with adhesive and/or the like. Then, the yoke 31 that holds the magnet 32 is inserted into a slot 11B of the base 11 as illustrated in a dashed line with an arrow in FIG. 8. Both ends of the yoke 31 that has been inserted into the slot 11B of the base 11 are hooked on part of the base 11, as illustrated in FIG. 7, so that the yoke 31 holding the magnet 32 is prevented from falling off from the base 11 downward.

The magnet 32 is a member to be attracted to a steel material by magnetic force. The magnet 32 is mounted to the base 11 through the yoke 31 so as to be exposed on the bottom surface side of the base 11, as described above. This allows the antenna device 10 to be attached to and detached from a steel material constituting a vehicle or the like.

In an embodiment of the present disclosure, arm portions 12D formed at the case 12 each block the slot 11B into which the yoke 31 having the magnet 32 fixed thereto has been inserted, as given by a dashed-dotted line with an arrow in FIG. 7. This prevents the yoke 31 holding the magnet 32 from falling off from the base 11 to the left and right sides.

The magnets 32 of an embodiment of the present disclosure can also be directly fixed to the base 11 with screws, adhesive, and/or by heat welding. However, the number of parts and the number of mounting operations increase. Thus, with the yokes 31 to hold the magnets 32 being inserted into the slots 11B of the base 11 and the slots 11B being blocked with the arm portions 12D of the case 12, as in an embodiment of the present disclosure, it is possible to reduce the number of parts and the number of mounting operations. Note that the arm portions 12D of the case 12 also serve as positioning portions when fixing the case 12 to the base 11. Accordingly, it is possible to further reduce the number of parts and the number of mounting operations.

However, the magnets 32 may be directly fixed to the base 11 with screws, adhesive, and/or by heat welding, and the antenna device 10 does not have to have the mounting members 30. Further, in an embodiment of the present disclosure, the mounting members 30 are mounted to the base 11 on both the left and right sides, but the present disclosure is not limited thereto. For example, even if the base 11 has a circular or oval shape, it is possible to stably mount the antenna device 10 to the steel material by a uniform magnetic force, with at least two mounting members 30 being arranged so as to face each other. Further, since the magnetic force increases with an increase in the number of the mounting members 30, it is possible to mount the antenna device 10 to the steel material by a strong force.

==First Guide Portion 12C and Second Guide Portion 23==

Figure 9:
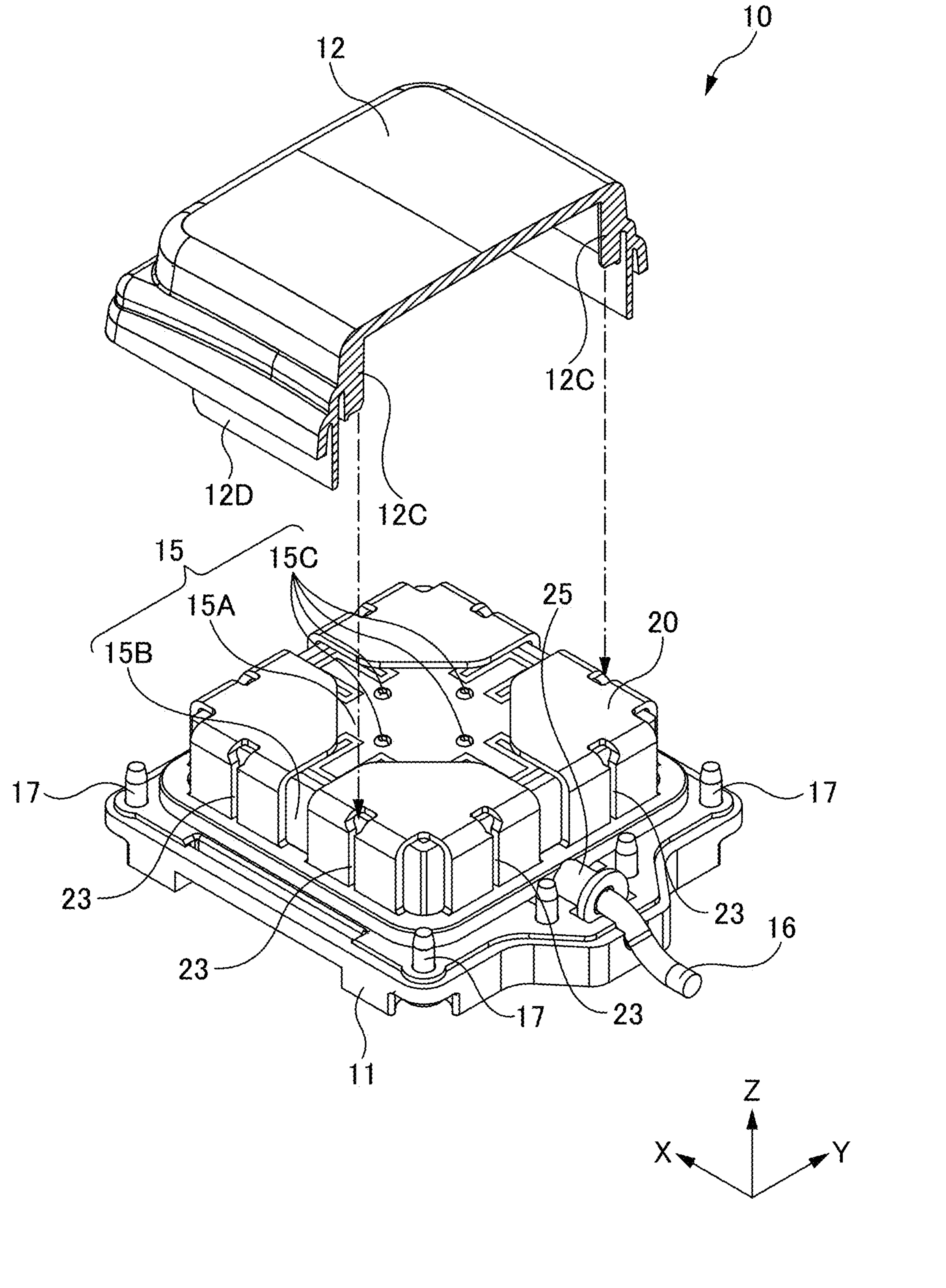
FIG. 9 is a partial cross-sectional perspective view of an antenna device 10 illustrating a cross section of a case 12.
Figure 10:
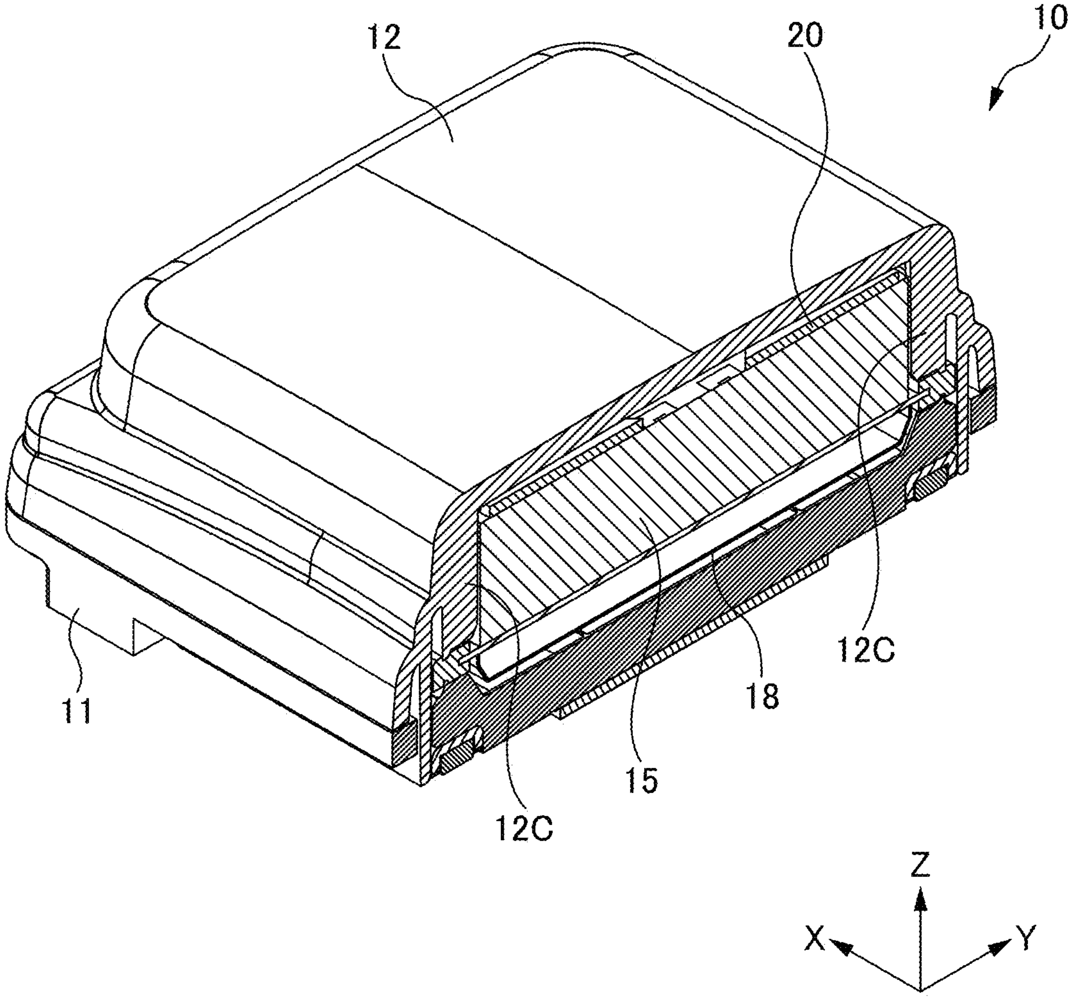
FIG. 10 is a cross-sectional perspective view illustrating an antenna device 10.

FIG. 9 is a partial cross sectional perspective view of the antenna device 10 illustrating a cross section of the case 12. FIG. 10 is a cross-sectional perspective view of the antenna device 10.

In the antenna device 10 of an embodiment of the present disclosure, the case 12 has first guide portions 12C. Further, the elastic body 20 has second guide portions 23.

The first guide portions 12C and the second guide portions 23 illustrated in FIG. 9 are members to serve as guides when assembling the case 12 and the elastic body 20 mounted to the patch antenna 15. The first guide portions 12C each are a ridge portion formed in the up-down direction at the inner wall surface of the case 12, as illustrated in FIG. 9. In other words, the first guide portions 12C each are a plate-shaped member to protrude from the side wall surface of the case 12 toward the patch antenna 15. Further, the second guide portions 23 each are a groove portion formed in the up-down direction in the elastic body 20. When assembling the case 12 and the elastic body 20 mounted to the patch antenna 15, the first guide portions 12C move while fitting into the grooves of the second guide portions 23, respectively, to thereby guide the case 12 (or guide the elastic body 20). This can improve the ease of assembly of the antenna device 10. Further, it is possible to prevent the elastic body 20 from being caught on part of the case 12 and being turned up when assembling the case 12 and the elastic body 20 mounted to the patch antenna 15.

Note that the first guide portions 12C provided on the left and right sides of the inner wall surface of the case 12 are located so as to sandwich the patch antenna 15 therebetween, as illustrated in FIG. 10. Accordingly, in the antenna device 10 of an embodiment of the present disclosure, the first guide portions 12C may suppress the shaking in the left-right direction of the patch antenna 15.

However, the first guide portions 12C and the second guide portions 23 do not have to be provided.

SUMMARY

The antenna device 10 of an embodiment of the present disclosure has been described above. The antenna device 10 of an embodiment of the present disclosure comprises: the exterior body (the base 11 and the case 12) forming the accommodation space 13; the substrate 14 accommodated in the accommodation space 13 and held by the exterior body; the patch antenna 15 accommodated in the accommodation space 13 and disposed on the substrate 14; and the elastic body 20 disposed between the exterior body and the patch antenna 15, as illustrated in FIGS. 1, 2, 5B, and 6, for example. According to the antenna device 10 of an embodiment of the present disclosure, it is possible to suppress damage to the patch antenna 15 when the antenna device 10 receives shock or vibrations.

Further, in the antenna device 10 of an embodiment of the present disclosure, at least part of the elastic body 20 contacts the exterior body (the case 12) and the patch antenna 15, as illustrated in FIGS. 5B and 6, for example. This makes it possible to further suppress damage to the patch antenna 15 when the antenna device 10 receives shock or vibrations.

Further, in the antenna device 10 of an embodiment of the present disclosure, at least part (the pressing member 12B) of the exterior body (the case 12) presses the elastic body 20 against the patch antenna 15, as illustrated in FIGS. 5B and 6, for example. This makes it possible to further suppress damage to the patch antenna 15 when the antenna device 10 receives shock or vibrations.

Further, in the antenna device 10 of an embodiment of the present disclosure, the elastic body 20 pressed by the exterior body (the pressing member 12B of the case 12) is disposed between the exterior body and the patch antenna 15 in a deformed state, as illustrated in FIG. 6, for example. This makes it possible to further suppress damage to the patch antenna 15 when the antenna device 10 receives shock or vibrations.

Further, in the antenna device 10 of an embodiment of the present disclosure, at least part of the elastic body 20 is disposed between the exterior body (the case 12) and side surfaces of the patch antenna 15, as illustrated in FIG. 5B, for example. This makes it possible to further suppress damage to the patch antenna 15 when the antenna device 10 receives shock or vibrations.

Further, in the antenna device 10 of an embodiment of the present disclosure, at least part of the elastic body 20 is disposed between the exterior body (the case 12) and the front surface of the patch antenna 15, as illustrated in FIGS. 3A and 3B, for example. This makes it possible to suppress damage to the radiating element 15A, which is more greatly affected by the damage in the patch antenna 15, caused by the radiating element 15A contacting the inner wall surface of the exterior.

Further, in the antenna device 10 of an embodiment of the present disclosure, the patch antenna 15 includes at least one feeding portion (the feeding point 15C), and, in a top view, the elastic body 20 and the at least one feeding portion are non-overlapping, as illustrated in FIGS. 3A and 3B, for example. This can suppress the influence of the elastic body 20 on the radiation of the patch antenna 15.

Further, in the antenna device 10 of an embodiment of the present disclosure, the elastic body 20 includes at least two overlapping portions that overlap with the front surface of the patch antenna 15 in the top view, for example, as illustrated in FIGS. 3A and 3B. This makes it possible to further suppress the damage to the patch antenna 15 when the antenna device 10 receives shock or vibrations.

Further, in the antenna device 10 of an embodiment of the present disclosure, the exterior body includes the case 12 located on the front surface side of the patch antenna 15 and the base 11 located on the back surface side of the patch antenna 15, and the pressing member 12B disposed between the case 12 and the elastic body 20, as illustrated in FIGS. 4 to 6, for example. This makes it possible to further suppress the damage to the patch antenna 15 when the antenna device 10 receives shock or vibrations.

Further, in the antenna device 10 of an embodiment of the present disclosure, the pressing member 12B is a protruding portion formed at the case 12, and at least part of the protruding portion contacts the elastic body 20, as illustrated in FIGS. 5B and 6, for example. This makes it possible to further suppress the damage to the patch antenna 15 when the antenna device 10 receives shock or vibrations.

Further, in the antenna device 10 of an embodiment of the present disclosure, the case 12 includes the plurality of protruding portions (the pressing members 12B) in the top view, for example, as illustrated in FIG. 4. This makes it possible to further suppress the damage to the patch antenna 15 when the antenna device 10 receives shock or vibrations.

Further, in the antenna device 10 of an embodiment of the present disclosure, the exterior body (the case 12) includes a first guide portion 12C, and the elastic body 20 includes a second guide portion 23 to guide the first guide portion 12C, for example, as illustrated in FIGS. 9 and 10. This makes it possible to facilitate the assembly of the antenna device 10.

Embodiments of the present disclosure described above are simply to facilitate understanding of the present disclosure and are not in any way to be construed as limiting the present disclosure. In addition, the present invention can be modified or improved within the scope of the gist of the present invention, and it is needless to say that equivalents thereof are included in the present invention.

REFERENCE SIGNS LIST

10 antenna device
11 base
11B slot
12 case
12B pressing member
12C first guide portion
12D arm portion
13 accommodation space
11 substrate
15 patch antenna
15A radiating element
15B dielectric
15C feeding point
16 coaxial cable
17 screw
18 shield cover
20 elastic body
60 holding portion
23 second guide portion
25 grommet
30 mounting member
31 yoke
32 magnet

The invention claimed is:

1. An antenna device comprising:
an exterior body forming an accommodation space;
a substrate accommodated in the accommodation space and held by the exterior body;
a patch antenna accommodated in the accommodation space and disposed on the substrate; and
an elastic body disposed between the exterior body and the patch antenna, wherein
the exterior body includes a case located on a front surface side of the patch antenna and a base located on a back surface side of the patch antenna, and
the elastic body is disposed between the case and the base, and
at least part of the elastic body contacts the exterior body and the patch antenna.

2. The antenna device according to claim 1, wherein at least part of the exterior body presses the elastic body against the patch antenna.

3. The antenna device according to claim 2, wherein the elastic body pressed by the exterior body is disposed between the exterior body and the patch antenna in a deformed state.

4. The antenna device according to claim 1, wherein at least part of the elastic body is disposed between the exterior body and side surfaces of the patch antenna.

5. The antenna device according to claim 4, wherein a pressing member is disposed between the case and the elastic body.

6. The antenna device according to claim 5, wherein
the pressing member is a protruding portion formed at the case, and
at least part of the protruding portion contacts the elastic body.

7. The antenna device according to claim 6, wherein
the protruding portion includes a plurality of protruding portions, and
the case includes the plurality of protruding portions in a top view.

8. The antenna device according to claim 6, wherein
a radiation surface is formed at a front surface of the patch antenna,
the patch antenna includes a radiating element that includes the radiation surface, and
the protruding portion protrudes perpendicular to the radiation surface.

9. The antenna device according to claim 1, wherein
a radiation surface is formed at a front surface of the patch antenna, and
at least part of the elastic body is disposed between the exterior body and the front surface of the patch antenna.

10. The antenna device according to claim 9, wherein
the patch antenna includes at least one feeding portion, and
in a top view, the elastic body and the at least one feeding portion are non-overlapping.

11. The antenna device according to claim 9, wherein the elastic body includes at least two overlapping portions that overlap with the front surface of the patch antenna in a top view.

12. The antenna device according to claim 9, wherein a feeding point is formed at the front surface of the patch antenna.

13. The antenna device according to claim 1, wherein
the exterior body includes a first guide portion, and
the elastic body includes a second guide portion to guide the first guide portion.

14. The antenna device according to claim 13, wherein
the first guide portion is a plate-shaped member to protrude from a side wall surface of the exterior body toward the patch antenna, and
the second guide portion is a groove portion formed in an up-down direction in the elastic body.

15. The antenna device according to claim 1, wherein
the elastic body has a holding portion, and
the holding portion holds the substrate.

16. An antenna device comprising:
an exterior body forming an accommodation space;
a substrate accommodated in the accommodation space and held by the exterior body;
a patch antenna accommodated in the accommodation space and disposed on the substrate; and
an elastic body disposed between the exterior body and the patch antenna, wherein
the exterior body includes a case located on a front surface side of the patch antenna and a base located on a back surface side of the patch antenna,
the patch antenna includes a cable electrically connected thereto, the elastic body has a grommet through which the cable is inserted, and the elastic body is disposed between the case and the base.

17. An antenna device comprising:

an exterior body forming an accommodation space;

a substrate accommodated in the accommodation space and held by the exterior body;

a patch antenna accommodated in the accommodation space and disposed on the substrate; and an elastic body disposed between the exterior body and the patch antenna, wherein the exterior body includes a case located on a front surface side of the patch antenna and a base located on a back surface side of the patch antenna, the elastic body is disposed between the case and the base, and at least part of the elastic body is disposed between the exterior body and side surfaces of the patch antenna.

18. The antenna device according to claim 17, wherein a pressing member is disposed between the case and the elastic body.

19. The antenna device according to claim 18, wherein the pressing member is a protruding portion formed at the case, and at least part of the protruding portion contacts the elastic body.

20. The antenna device according to claim 19, wherein the protruding portion includes a plurality of protruding portions, and the case includes the plurality of protruding portions in a top view.

* * * * *